(12) United States Patent
Stevens

(10) Patent No.: US 6,977,766 B2
(45) Date of Patent: Dec. 20, 2005

(54) DISPLAY DEVICE WITH SIDE-ILLUMINATED CELL

(75) Inventor: Chad Stevens, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/757,915

(22) Filed: Jan. 14, 2004

(65) Prior Publication Data

US 2005/0152021 A1  Jul. 14, 2005

(51) Int. Cl.[7] .............................. G02B 26/00
(52) U.S. Cl. ................................. 359/296
(58) Field of Search ................ 359/265, 253, 359/296, 452, 190, 228, 227; 430/19, 35, 430/38, 32; 345/107; 385/901, 125

(56) References Cited

U.S. PATENT DOCUMENTS

| | | |
|---|---|---|
| 4,648,956 A | 3/1987 | Marshall et al. |
| 5,463,492 A | 10/1995 | Check, III |
| 6,130,774 A | 10/2000 | Albert et al. |
| 6,184,856 B1 | 2/2001 | Gordon, II et al. |
| 6,271,823 B1 | 8/2001 | Gordon, II et al. |
| 6,486,866 B1 | 11/2002 | Kuwahara et al. |
| 6,512,626 B1 * | 1/2003 | Schmidt ............ 359/296 |
| 2002/0033792 A1 | 3/2002 | Inoue |
| 2002/0135861 A1 | 9/2002 | Nakao et al. |
| 2002/0191133 A1 | 12/2002 | Enomoto et al. |
| 2002/0196217 A1 | 12/2002 | Kanno |
| 2003/0013238 A1 | 1/2003 | Ogawa |
| 2003/0043450 A1 | 3/2003 | Liang et al. |

\* cited by examiner

*Primary Examiner*—Hung Xuan Dang
*Assistant Examiner*—Joseph Martinez

(57) ABSTRACT

A display device may include a cell containing a suspension fluid and at least one suspension particle dispersed within the suspension fluid. The suspension particle may be adapted to migrate in the suspension fluid under the influence of an electric field. A light waveguide layer may extend adjacent to a side of the cell. The light waveguide layer may be adapted to conduct light laterally into the cell through the side of the cell.

7 Claims, 2 Drawing Sheets

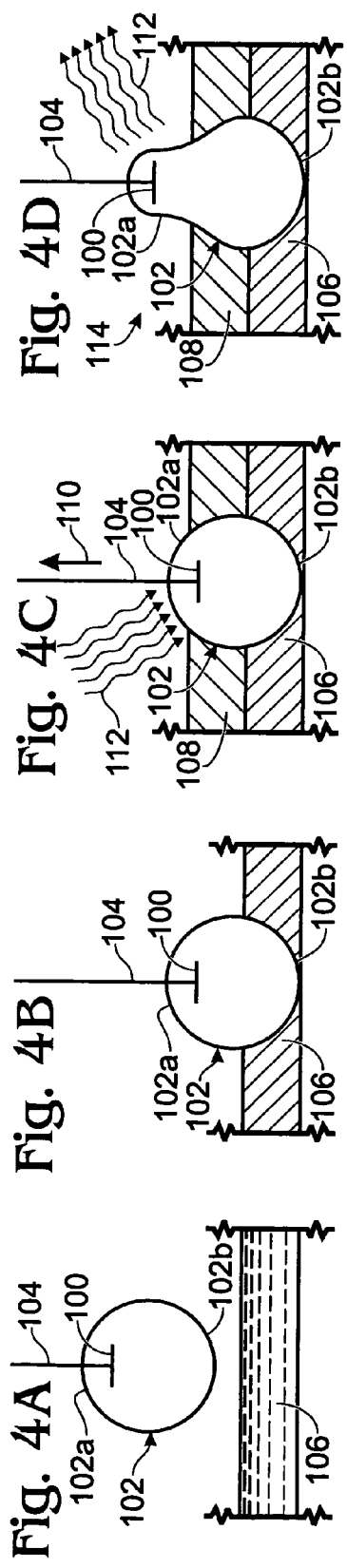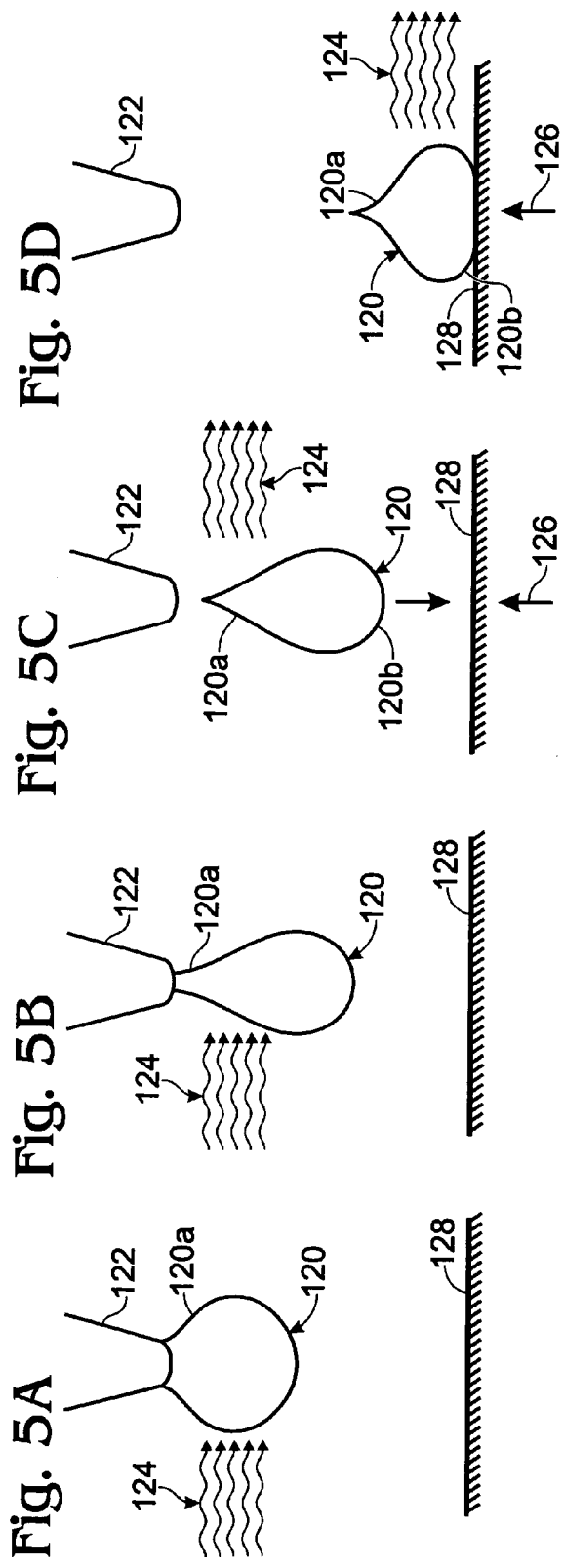

DISPLAY DEVICE WITH SIDE-ILLUMINATED CELL

BACKGROUND

Display devices of various types are used to produce displays of images for viewing by users of the devices. The effectiveness of a display may depend on the ability of a viewer to comfortably perceive a displayed image. This effectiveness may be based on the ability of a display device to provide sufficient contrast between image elements, in combination with the amount of light that is emitted overall by the display device. Contrast typically is inherent in a device, since it is related to the size and quantity of display elements used to produce an image, and to the brightness of individual display elements of the display device. Accordingly, for a given type of device, such as a CRT, liquid crystal display, or electrophoretic display, an increase in the amount of light emitted by the device can result in an improved display.

BRIEF DESCRIPTION OF THE DRAWINGS

FIGS. 4A–4D illustrate the formation of a display cell according to another embodiment of the invention.

FIGS. 5A–5D illustrate the formation of a display cell according to another embodiment of the invention.

DETAILED DESCRIPTION

An electrophoretic cell may be a cell that includes particles suspended in a fluid and may use an electric field to migrate the particles through the fluid between different positions in the cell. The electrophoretic cell can serve as a display element when the particles can be made to move between a first position in which the particles are distributed along a surface of the cell where it can be viewed and a second position in which the particles are substantially hidden from view. The cell can produce different effects depending on the intended display. For instance, the particles can be reflective, colored, white or black in visual character. The fluid in which the particles are suspended can be colorless or colored. In certain combinations of these characteristics, the cell can function as a light valve, with the particles selectively blocking light from passing through the cell or allowing light to pass through the cell. An array of cells along a display surface positioned between a light source and the viewer can be used to create images for display by blocking light from being transmitted through selected cells.

Figure 1:
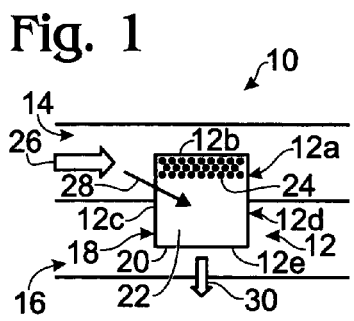
FIG. 1 is a simplified illustration of a display device according to an embodiment of the invention.

Referring now to the drawings and more particularly to FIG. 1, there is illustrated a display device 10 that may include a cell 12 and a light-conducting waveguide layer 14. Device 10 may also include a base layer 16. Cell 12 may form a microcapsule, or more generally, a capsule 18 that includes an enclosing light-conducting membrane 20. The cell may have a first portion 12a, including a first end 12b that extends into or through layer 14. The cell may also include one or more sides, such as side 12c, exposed to layer 14. A second portion 12d of the cell may include a second end 12e that may extend beyond layer 14. Base layer 16 may enclose, support or surround second end 12e.

Cell 12 may contain a light-conducting suspension fluid 22, and one or more particles 24 suspended in the fluid. When particles 24 have an electrostatic charge, and an appropriate electric field is induced in cell 12, device 10 may function as an electrophoretic display device. The charged suspension particles are caused to migrate to one or the other of ends 12b and 12e depending on the direction of the applied electric field. Incident light 26 may be directed along waveguide layer 14. When incident light contacts side 12c, at least a portion of it may be conducted through the cell and toward end 12e. When particles 24 are positioned in the first end 12b, as shown, received light 28 may be conducted through cell end 12e and out of the cell as display light 30. Since the particles are not in the path of the light, light incident on the side of the cell is not blocked by the particles. As a result, more of the light can be emitted from the cell than would be possible if the cell were backlit. This, in turn, may result in brighter cells, more contrast, and an overall brighter display. Display light 30 may be characterized as having a color corresponding to the color of fluid 22, the color of incident light 26, or a combination of the colors of the fluid and the incident light. However, if particles 24 cover cell end 12e, no or little light may escape through end 12e, and the cell may appear to have the color of the particles.

An observer may see light transmitted through the cell, which may form a display that may include one cell, or a plurality of cells, such as in an array with each cell forming an image element, or a component of a display element. Accordingly, display device 10 may be a display element of a display device including a plurality of display elements. A display element, when viewed, may represent an image element, also known as a pixel or pel, or a component of an image element. For example, different adjacent cells can have differently colored particles or differently colored solutions. Optionally, a cell may have differently colored particles of different electrostatic charges. A combination of adjacent differently colored cells may thus form, in combination, an image element.

Figure 2:
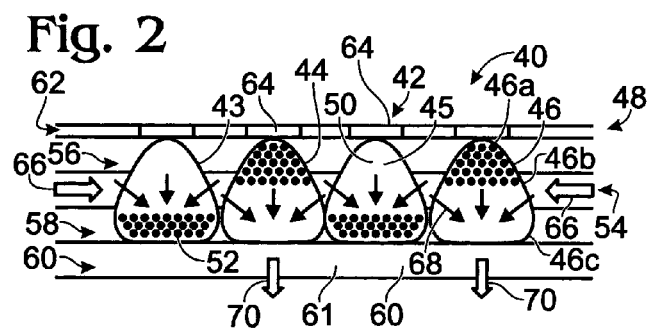
FIG. 2 is an illustration of a display device having a plurality of display cells according to another embodiment of the invention.

As mentioned, some electrophoretic display devices may include a plurality of display elements. An example of such a display device 40 is depicted in FIG. 2. Device 40 may include an array 42 of cells, as represented by cells 43, 44, 45 and 46, and a multi-layer assembly 48 in which the cells may be supported. Each cell may include a suspension fluid 50 and respectively charged particles 52. Assembly 48 can include an intermediate light-conducting waveguide layer 54 that may be sandwiched between outer support layers 56 and 58. Each cell may have a relatively narrow end, such as end 46a, that may be supported in layer 56, an intermediate portion having sides, such as side 46b, that may be exposed to or surrounded by waveguide layer 54, and a relatively enlarged end 46c that may be supported in layer 58.

A continuous layer 60, attached to layer 58, may be adapted to conduct light emitted from the cells, as well as hold an electrical charge. Accordingly, layer 60 may also function as an electrode 61. The opposite side of assembly 48 may include a layer 62 attached to layer 56. Individually addressable electrodes 64 may be positioned in layer 62, with an electrode in line with a narrow end of each cell, such as end 46a. Electrodes 61 and 64 may produce the charges that cause the charged particles 52 to migrate to a selected end of each cell. Other electrode and cell configurations may be used.

As with display device 10, incident light 66, from a corresponding light source, may be directed along waveguide layer 54. The incident light may enter each cell from the side, as illustrated. For those cells in which particles 52 are collected adjacent the narrow ends of the cells, such as with cells 44 and 46, the incident light directly enters the cells, as transmitted light 68, without being diminished by the particles. The transmitted light in each cell may then be transmitted through the broad end of the cells to become viewable display light 70. For those cells in which particles 52 are collected adjacent the broad ends of the cells, such as with cells 43 and 45, the transmitted light may be prevented from passing through the broad ends of the cells, preventing these cells from contributing to the viewable display light.

Figure 3A:
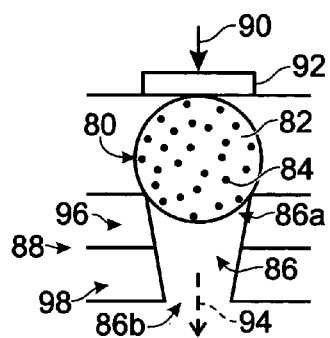
FIGS. 3A–3C illustrate the formation of a display cell according to yet another embodiment of the invention.
Figure 3B:
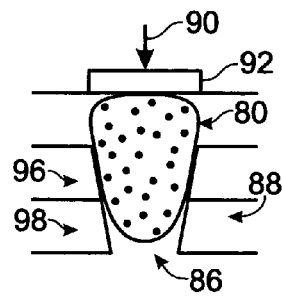
Figure 3C:
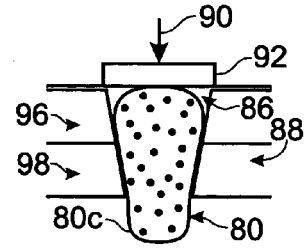

There are various methods that may be used to make a tapered cell. FIGS. 3A–3C illustrate one such method. A deformable cell 80, that may contain a fluid 82 and electrophoretic particles 84, may be positioned adjacent one end of a passageway 86 formed in a substrate 88. The passageway may be tapered, having a broad end 86a and a narrow end 86b. Optionally, passageway 86 may be closed at the narrow end, making it a cavity or chamber, or it may have other shapes, such as a cylindrical shape. In the case of a cavity or chamber, a cell may be formed using the sides of the cavity or chamber as the cell walls or membrane. In the latter case, the cell may be formed by inserting the fluid and particles, and sealing the cavity or chamber.

Cell 80 may be inserted into the passageway. This may be accomplished in various ways. For instance, the cell may be pressed into the passageway, such as by applying a force 90 onto a plate 92 or other force-applying element or material, placed against the cell, such as shown. Optionally, the cell may be pulled into the passageway, such as by applying a reduced ambient atmosphere or vacuum to the opposite end of the passageway, as represented by arrow 94.

FIG. 3B shows cell 80 partially inserted into the passageway. In some embodiments, this may be sufficient. In other embodiments, it may be desired to have the cell positioned entirely in the passageway, or even through the passageway, such as shown in FIG. 3C. In this latter figure, it is seen that a portion 80c of the cell may extend beyond the narrow end of the passageway.

Substrate 88 may be formed of one or more layers, such as a first layer 96 and a second layer 98. Substrate 88 and cell 80 may be part of a display device. If first layer 96 is a light waveguide layer, then the position of the cell in FIG. 3B may be appropriate to cause light to enter into the cell from the side, as described above. Similarly, if second layer 98 is a waveguide layer, then the position of the cell in FIG. 3C also may be appropriate to allow light to enter the cell from the side.

The method illustrated in FIGS. 3A, 3B and 3C may also be appropriate where the outer membrane of the cell is in a pliable condition, and can be treated to make it rigid. For example, the cell membrane may be a thermoplastic. In this example, the cell may be heated before inserting it into the passageway, and cooled after it is in the passageway. As a further example, an epoxy or other resin-based material may be used to form the membrane, in which case the membrane may harden with the passage of time.

Referring now to FIGS. 4A–4D, another method for forming a shaped electrophoretic cell and or a display device is illustrated. An electrode 100 may be attached to or positioned in a first end 102a of an electrophoretic cell 102, such as during making of the cell. Although not shown, cell 102 may include a suspension fluid and electrophoretic particles, as has been described in the preceding embodiments. The electrode may be attached to a conductor 104 or other member that extends away from the cell and with which the electrode may be manipulated.

An end 102b of the cell spaced from electrode 100 may be restrained. This may be accomplished in various ways. One way may be by securing end 102b in a base layer 106. As illustrated in FIG. 4A, this may be accomplished by inserting the cell end into the base layer when the layer is in a liquid state, as may exist for resin-based or thermoplastic materials. When the layer is transformed into a solid state, as illustrated in FIG. 4B, the cell end may be embedded in the layer and secured to it.

Layer 106 may be of various thicknesses and may leave cell end 102a exposed. Optionally, a second layer 108 of material may be applied to cell 102, similar to the application of the base layer. As is illustrated in FIG. 4C, a force 110 may be applied to cell end 102a directed away from cell end 102b, until the cell deforms, as illustrated in FIG. 4D. Depending on the weight of the cell relative to the deformability of cell end 102a, it may be sufficient to use gravity to restrain the cell. If cell 102 is formed of a thermoplastic material, heat 112 may be applied to cell end 102a to transform it into a deformable state. Holding the cell end in a deformed state, heat 112 may be removed, thereby cooling the cell end and transforming it into a rigid state in the shape shown in FIG. 4D.

The assembly of electrode 100, cell 102, conductor 104 and base layer 106 may form a display device 114, similar to display devices 10 and 40, in which base layer 106 may be a light waveguide layer. In some embodiments, a second layer 108 may be included in the display device, with the second layer forming a light waveguide layer.

Yet another method of forming an electrophoretic cell is illustrated in FIGS. 5A–5D. An electrophoretic cell 120 may be made of a thermoplastic material, and may include a suspension fluid and charged particles as described in the previous embodiments. As shown in FIG. 5A, cell 120 may be secured by an apparatus 122, such as an extruder from which the cell may be formed, or a device with an aperture through which a vacuum may be applied to a first portion 120a of the cell.

Cell 120 may be suspended from apparatus 122. A suitable energy 124, such as heat or infrared radiation, may be applied to the cell, allowing it to deform into an elongate shape, such as a teardrop shape as shown in FIG. 5B. Once the cell exists in an elongate shape, a second portion 120b, spaced from portion 120a, may be broadened. This broadening may be provided in various ways, such as by applying a force 126 to portion 120b with an external surface, such as surface 128. This may be achieved by pressing surface 128 against the bottom of the cell as the cell is suspended. Optionally and as shown, the cell may be released from apparatus 122 and allowed to land on surface 128. In this latter method, gravity acting on the cell or force of extraction from extrusion apparatus 122 may produce sufficient momentum in the cell to cause cell portion 120b to broaden as it lands on the surface.

As cell portion 120a elongates during this process, this cell portion may be maintained in the elongated shape. This may be accomplished, at least in part, by removing heat 124 from this cell portion, as illustrated in FIG. 5C. Further, once cell portion 120b has formed into a broadened shape, the broadened shape may be maintained, such as by the further removal of heat 124 from the cell. This may be accompanied by the continued appropriate application of force 126 to cell portion 120b. The weight of cell 120 on surface 128 may be sufficient to broaden cell portion 120b or to maintain cell portion 120b in the broadened shape while the cell is cooled.

The resulting cell, which may have a narrow portion 120a and broadened portion 120b, may be used in a display device, such as display device 10 or 40.

Figure 6:
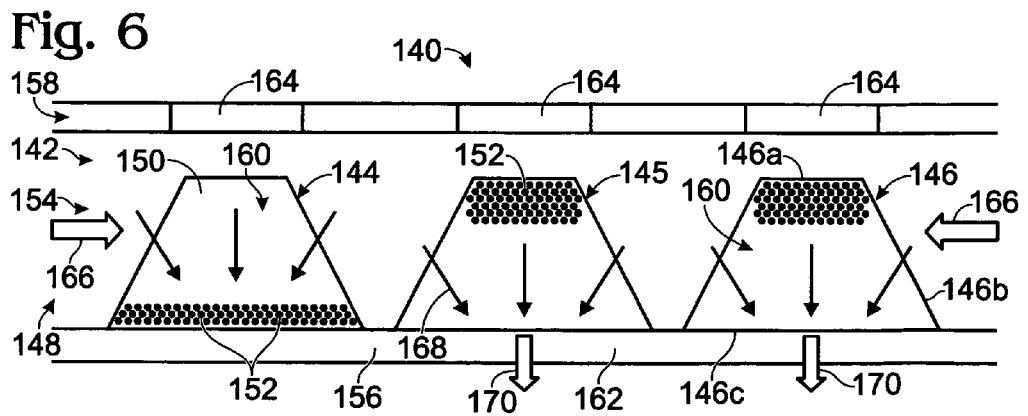
FIG. 6 illustrates a display device according to another embodiment of the invention.

Referring now to FIG. 6, yet another embodiment of a display device is shown generally at 140. Device 140 may include an array 142 of cells, as represented by cells 144, 145 and 146, and a multi-layer assembly 148 in which the cells may be supported, positioned or embedded. Each cell may include a suspension fluid 150 and respectively charged particles 152. Assembly 148 can include an intermediate light conducting waveguide layer 154 that may be sandwiched between outer layers 156 and 158. Each cell may include a chamber 160 in waveguide layer 154. Chamber 160 may be a cavity, passageway, compartment, channel or other space defined by an opening in waveguide layer 154, or in a combination of layers including layer 154. The cell chambers may be formed by etching, embossing, casing, injection molding, photolithographic processes, drilling, embedding a preformed element, or other suitable technique. The cell chambers also may have a variety of shapes, for example, having a relatively narrow end, such as end 146a, an intermediate portion having sides, such as side 146b, and a relatively enlarged end, such as end 146c.

Layer 156 may be a continuous layer attached to layer 154 and sealing chambers 160, may be adapted to conduct light emitted from the cells, and may hold an electrical charge. Accordingly, layer 156 may also be an electrode 162. Individually addressable electrodes 164 may be positioned in layer 158, with an electrode in line with a narrow end of each cell, such as end 146a. Electrodes 162 and 164 may produce the charges that cause the charged particles 152 to migrate to a selected end of each cell. Other electrode and cell configurations may be used.

Incident light 166, from a corresponding light source, may be directed along waveguide layer 154. The incident light may enter each cell from the side, as illustrated. For those cells in which particles 152 are collected adjacent to the narrow ends of the cells, such as with cells 145 and 146, the transmitted light 168 in each cell may then be transmitted through the broad end of the cells to become viewable display light 170. For those cells in which particles 152 are collected adjacent to the broad ends of the cells, such as with cell 144, the transmitted light may be prevented from passing through the broad ends of the cells, preventing these cells from contributing to the viewable display light.

While the present disclosure has been provided with reference to the foregoing embodiments, those skilled in the art will understand that many variations may be made therein without departing from the spirit and scope defined in the following claims. The foregoing embodiments are illustrative, and no single feature, procedure or element is essential to all possible combinations that may be claimed in this or a later application. Moreover, the description should be understood to include all novel and non-obvious combinations of elements described herein, and claims may be presented in this or a later application to any novel and non-obvious combination of these elements. Where the claims recite "an", "a first", or "another" element or the equivalent thereof, such claims should be understood to include incorporation of one or more such elements, neither requiring nor excluding two or more such elements.

What is claimed is:

1. A display device comprising:
 a cell having a side, the cell containing a suspension fluid and at least one suspension particle dispersed within the suspension fluid, the suspension particle being adapted to migrate in the suspension fluid under the influence of an electric field; and
 a light waveguide layer extending around the sides of the cell, the light waveguide layer being adapted to conduct light into the cell through the side of the cell,
 wherein the light waveguide layer has a first surface, wherein a first end of the cell extends beyond the first surface and the side of the cell tapers outwardly from the first surface toward an opposite second surface, and wherein a second end of the cell extends beyond the second surface of the layer.

2. A method of making a display element comprising:
 forming a light waveguide layer adapted to transmit light along a light path defined by the light waveguide layer;
 forming a cell containing a suspension fluid and at least one suspension particle dispersed within the suspension fluid, the suspension particle being adapted to migrate in the suspension fluid under the influence of an electric field, the cell extending into the light waveguide layer, wherein forming a cell includes forming a membrane enclosing the suspension fluid and at least one particle;
 forming a passageway extending through the light waveguide layer; and
 positioning the cell in the passageway with a portion of the cell extending beyond the light waveguide layer.

3. The method of claim 2 further comprising directing light along the light waveguide layer and laterally into the cell through the side of the capsule.

4. The method of claim 2 in which forming a passageway includes forming a passageway tapering between a first opening and a second opening smaller than the first opening, and positioning the cell includes inserting the cell into the first opening.

5. The method of claim 2 in which positioning the cell includes at least one of pressing the cell into the passageway, and pulling the cell into the passageway.

6. The method of claim 5 in which forming a passageway includes forming a passageway between first and second openings, positioning the cell includes positioning the cell against the first opening, and pulling the cell includes applying a reduced ambient pressure to the second opening sufficient to draw the capsule into the passageway.

7. The method of claim 6 in which the passageway extends through the light waveguide layer, and applying a reduced ambient pressure includes applying a reduced ambient pressure sufficient to draw the portion of the cell through the passageway until the portion extends beyond the light waveguide layer.

* * * * *